US011325681B2

(12) United States Patent
Fisher

(10) Patent No.: US 11,325,681 B2
(45) Date of Patent: May 10, 2022

(54) FLOOD PROTECTION

(71) Applicant: Jack D. Fisher, Phoenix, AZ (US)

(72) Inventor: Jack D. Fisher, Phoenix, AZ (US)

( * ) Notice: Subject to any disclaimer, the term of this patent is extended or adjusted under 35 U.S.C. 154(b) by 115 days.

(21) Appl. No.: 16/149,071

(22) Filed: Oct. 1, 2018

(65) Prior Publication Data

US 2019/0100287 A1    Apr. 4, 2019

Related U.S. Application Data

(60) Provisional application No. 62/606,569, filed on Sep. 29, 2017.

(51) Int. Cl.
*B60J 11/04*     (2006.01)
*B63B 22/24*    (2006.01)

(52) U.S. Cl.
CPC ............... *B63B 22/24* (2013.01); *B60J 11/04* (2013.01)

(58) Field of Classification Search
CPC ............ B63B 22/24; B60J 11/00; B60J 11/04
USPC .............. 296/136.01, 136.02, 136.07, 136.1; 220/9.4, 560; 150/166
See application file for complete search history.

(56) References Cited

U.S. PATENT DOCUMENTS

| | | | | |
|---|---|---|---|---|
| 5,800,006 | A | * | 9/1998 | Pettigrew ................. B60J 11/00 150/166 |
| 6,029,845 | A | * | 2/2000 | Mueller .................. B63B 34/00 220/560 |
| 6,059,105 | A | * | 5/2000 | Allain ...................... B60J 11/00 150/166 |
| 2014/0042771 | A1 | * | 2/2014 | Lo ........................... B60J 11/04 296/136.07 |

OTHER PUBLICATIONS

"Can the 'Ziplock bag for cars' keep floodwaters out?", ABC 13, Nov. 19, 2017, KTRK-TV, Houston, US.

* cited by examiner

*Primary Examiner* — Don M Anderson
*Assistant Examiner* — Elizabeth J Volz
(74) *Attorney, Agent, or Firm* — Kunzler Bean & Adamson

(57) ABSTRACT

An apparatus, system, and method are disclosed for a collapsible enclosure and a flotation container coupled to the collapsible enclosure to provide a buoyance to the collapsible enclosure. The collapsible enclosure comprises a floor portion, a top portion, and a side portion. The top portion is disposed opposite the floor portion. The side portion extends between the floor portion and the top portion. The collapsible enclosure being sealable to resist fluid penetration.

19 Claims, 6 Drawing Sheets

FLOOD PROTECTION

CROSS-REFERENCES TO RELATED APPLICATIONS

This application claims the benefit of and priority to U.S. Provisional Patent Application No. 62/606,569 entitled "VEHICLE FLOTATION DEVICE" and filed on 29 Sep. 2017 for Jack D. Fisher, which is incorporated herein by reference.

FIELD

This invention relates to water damage protection and more particularly relates to flood protection.

BACKGROUND

Heavy rains, storms, and floods are a destructive force in many regards. Frequently, these situations leave little time for preparation or reaction. The damage resulting from these events can be catastrophic. One form in which these event presents a danger is in water damage. Water from rains, storms, surges, floods, and the like can reach and affect almost everything. In some situations, there is not sufficient opportunity to move valuable assets before water presents a danger and destructive force.

SUMMARY

An apparatus is disclosed. The apparatus includes a collapsible enclosure and a flotation container coupled to the collapsible enclosure to provide a buoyance to the collapsible enclosure. The collapsible enclosure comprises a floor portion, a top portion, and a side portion. The top portion is disposed opposite the floor portion. The side portion extends between the floor portion and the top portion. The collapsible enclosure being sealable to resist fluid penetration.

A system is also disclosed. The system includes an apparatus and a vehicle. The apparatus is for protecting an object from a flood. The apparatus includes a collapsible enclosure and a flotation container coupled to the collapsible enclosure to provide a buoyance to the collapsible enclosure. The collapsible enclosure comprises a floor portion, a top portion, and a side portion. The top portion is disposed opposite the floor portion. The side portion extends between the floor portion and the top portion. The collapsible enclosure being sealable to resist fluid penetration. The vehicle is positioned within the collapsible enclosure. The collapsible enclosure is to resist exposure of the vehicle to a fluid.

A method is also disclosed. The method comprises arranging a collapsible enclosure to receive and enclose an object. The method also comprises positioning the object onto a floor portion of the collapsible enclosure. The method also comprises enclosing the object with the collapsible enclosure. the method also comprises configuring at least one flotation container coupled to the collapsible enclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
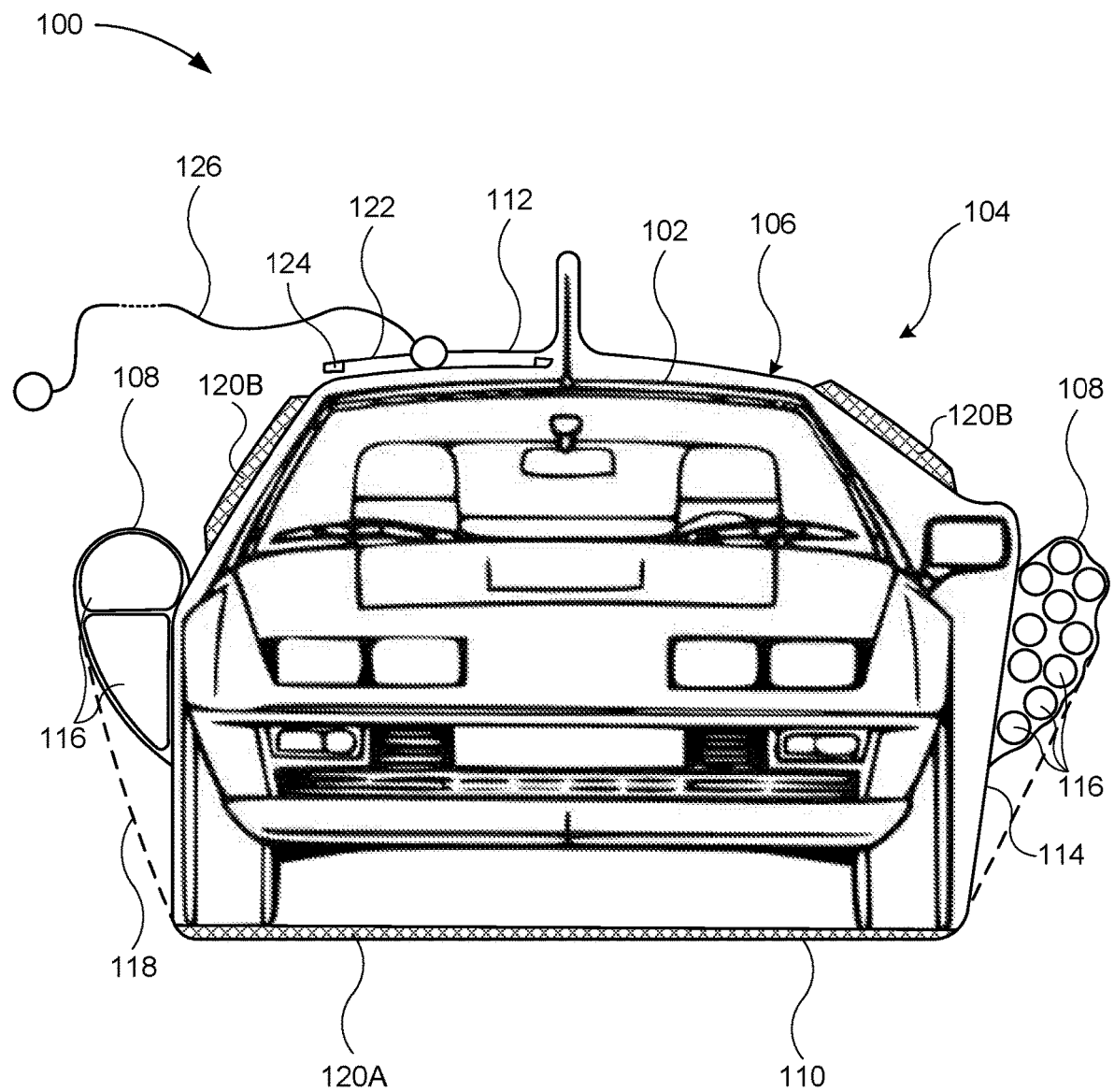
FIG. 1 is a front elevation view illustrating one embodiment of a system in accordance with the present invention.

FIG. 1 is a front elevation view illustrating one embodiment of a system 100 in accordance with the present invention. In the illustrated embodiment, the system 100 includes a vehicle 102 positioned within an apparatus 104 to resist exposure of the vehicle 102 to a fluid. In the illustrated embodiment, the apparatus 104 includes a collapsible enclosure 106 and a flotation container 108 coupled to the collapsible enclosure 106 to provide buoyancy to the collapsible enclosure 106.

The illustrated embodiment of the collapsible enclosure 106 includes a floor portion 110, a top portion 112, and a side portion 114. The top portion 112 is disposed opposite the floor portion 110. The side portion 114 extends between the floor portion 110 and the top portion 112. In some embodiments, the collapsible enclosure 106 is sealable to resist fluid penetration.

The flotation container 108 may capture at least one flotation element. The flotation container 108 may be deformable to capture the at least one flotation element 116. The flotation element 116 may be a gas such as air, $CO_2$, or the like. The flotation element 116 may be a plastic container, a foam (such as a closed cell foam), or the like. The flotation element 116 may be puncture-resistant, self-healing, or otherwise resilient. The flotation container 108 may include a separate armor, healing element, or other puncture resistance element, structure, or mechanism.

In the illustrated embodiment, the flotation container 108 is coupled to the side portion 114 of the collapsible enclosure 106. In other embodiments, the flotation container 108 may be coupled to at least one of the floor portion 110, the top portion 112, and the side portion 114. The flotation container 108 may be coupled to one of the floor portion 110, the top portion 112, and the side portion 114, or to multiple portions of the collapsible enclosure 106. For example, the flotation container 108 may be coupled to a side portion 114 and include a support 118 coupling the flotation container 108 to the floor portion 110.

The flotation container 108 may include multiple flotation containers 108. In the illustrated embodiment, flotation containers 108 are disposed on each side of the vehicle 102. In other embodiments, one or more flotation containers 108 may be placed on a single side of the collapsible enclosure 106. The flotation containers 108 may be positioned one over another, alongside one another, or coupled to one another. Other arrangements are also contemplated.

In some embodiments, a reinforcement element 120A, 120B is included. In the illustrated embodiment, the reinforcement element 120A, 120B takes the form of a platform 120A and an impact-resistant armor 120B. In the illustrated embodiment, the platform 120A is disposed in the collapsible enclosure 106 to be near the floor portion 110. In this manner, the platform 120A provides a rigid or semi-rigid surface for the vehicle 102 and may reduce stress or likelihood of damage to the collapsible enclosure 106. The platform 120A may be fixed relative to the collapsible enclosure 106 or may be moveable. In some embodiments, the collapsible enclosure 106 may accommodate a range of sizes of the platform 120A. The platform 120A may be a single-piece or multi-piece structure.

The impact-resistant armor 120B is disposed in the collapsible enclosure 106 to correspond to a window, light, antenna, body panel, or other portion of the vehicle 102 that may benefit from additional protection from impact or other forces. In the illustrated embodiment, the impact-resistant armor 120B is positioned to correspond to one or more windows of the vehicle 102. In the illustrated embodiment, the impact-resistant armor 120B is positioned exterior to the collapsible enclosure 106. In other embodiments, the impact-resistant armor 120B is positioned internal to the collapsible enclosure 106. In some embodiments, the impact-resistant armor 120B forms a portion of the collapsible enclosure 106 such that the collapsible enclosure 106 extends to an outer periphery of the impact-resistant armor 120B but does not extend across a side of the impact-resistant armor 120B.

In some embodiments, the impact-resistant armor 120B may be fixed relative to the collapsible enclosure 106. In other embodiments, the impact-resistant armor 120B may be repositionable relative to the collapsible enclosure 106. In some embodiments, the collapsible enclosure 106 may include abrasion-resistant elements to protect the vehicle 102 or the collapsible enclosure 106 from abrasion between the vehicle and the collapsible enclosure 106 or between the collapsible enclosure 106 and the environment.

The collapsible enclosure 106 may be closeable via a closure element 122. The closure element 122 may be a hook-and-loop, snaps, latches, ties, zippers, sliders, toggle-and-loop, hooks, magnets, adhesive, suction, or the like. In some embodiments, the collapsible enclosure is sealed via a sealing element 124. The sealing element 124 may includes a gasket, a bead, a grease strip, a flap, or the like. In some embodiments, the closure element 122 and the sealing element 124 may be the same structure.

The illustrated embodiment includes a tether 126. The tether 126 may be coupled to the collapsible enclosure 106. In some embodiments, the tether 126 is to secure the collapsible enclosure 106 relative to a structure. For example, the tether 126 may couple to a building, light pole, tree, rock face, or the like. In the illustrated embodiment, the tether 126 is shown as coupled to an upper region of the collapsible enclosure 106. In other embodiments, the tether 126 is coupled to a side or lower region of the collapsible enclosure 106.

Figure 2:
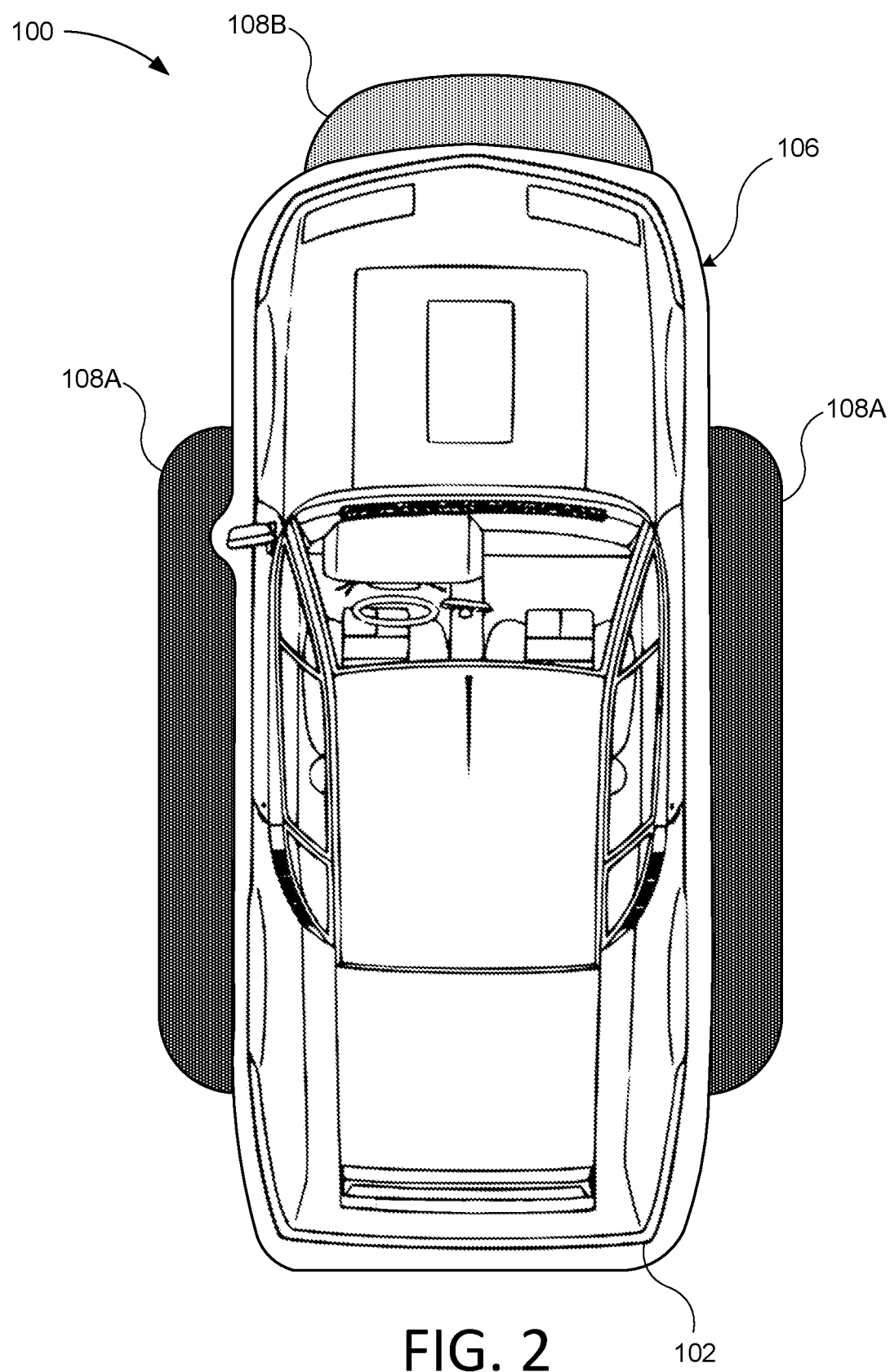
FIG. 2 is a top elevation view further illustrating the system of FIG. 1 in accordance with one embodiment of the present invention.

FIG. 2 is a top elevation view further illustrating the system 100 of FIG. 1. In the illustrated embodiment, side flotation containers 108A are coupled to the collapsible enclosure 106 to be alongside the vehicle 102. The illustrated embodiment also includes a forward flotation container 108B coupled to the collapsible enclosure 106 to be near a front or nose of the vehicle 102.

The illustrated forward flotation container 108B may provide additional buoyancy corresponding to a weight distribution of the vehicle 102. For example, if the vehicle 102 has an engine that is mounted in the front or nose of the vehicle 102, the weight distribution of the vehicle 102 may be higher near the front of the vehicle 102. In this case, additional buoyancy, provided by the forward flotation container 108B may allow the vehicle 102 to float more evenly or more level. This may reduce the chance of the vehicle 102 rolling or tipping in a manner which may damage the vehicle 102 or the collapsible enclosure 106.

Figure 3:
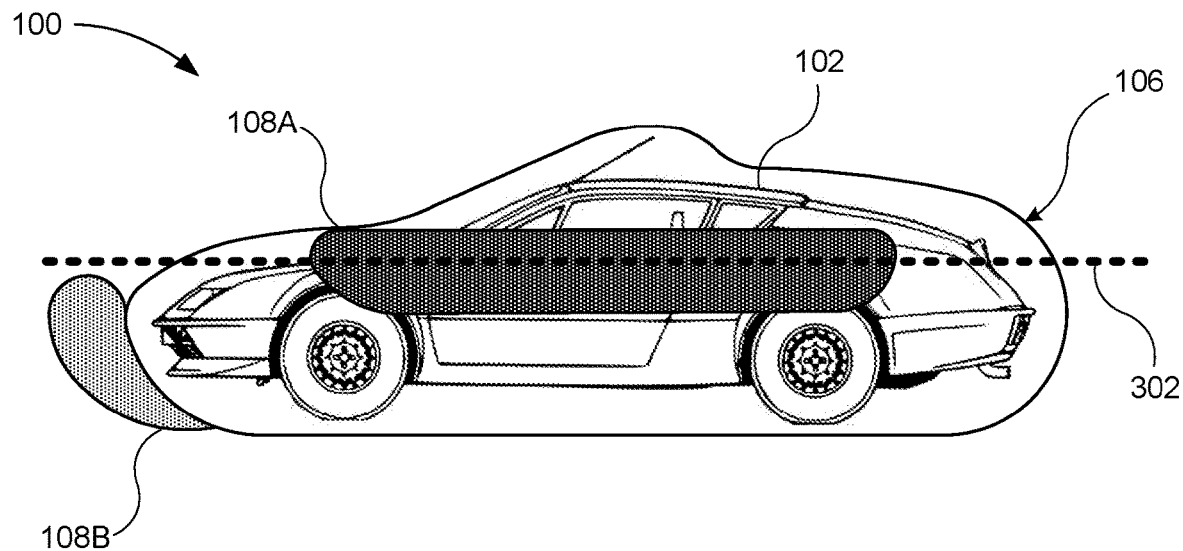
FIG. 3 is a side elevation view further illustrating the system of FIG. 1 with a front-heavy vehicle in accordance with one embodiment of the present invention.

FIG. 3 is a side elevation view further illustrating the system 100 of FIG. 1 with a front-heavy vehicle 102. In the illustrated embodiment, a weight distribution of the front-heavy vehicle 102 calls for the use of a forward flotation container 108B coupled to the collapsible enclosure 106 near the front of the vehicle 102. In the illustrated embodiment, the forward flotation container 108B is coupled to the collapsible enclosure 106 so as to be lower that the side flotation container 108A. In this arrangement, the front flotation container 108A may be fully submerged below a water level 302 to take full advantage of the buoyancy characteristics of the front flotation container 108B. This may reduce a size requirement for the front flotation container 108B. In other embodiments, the forward flotation container 108B may be positioned to be even with or relatively higher than the side flotation container 108A.

Figure 4:
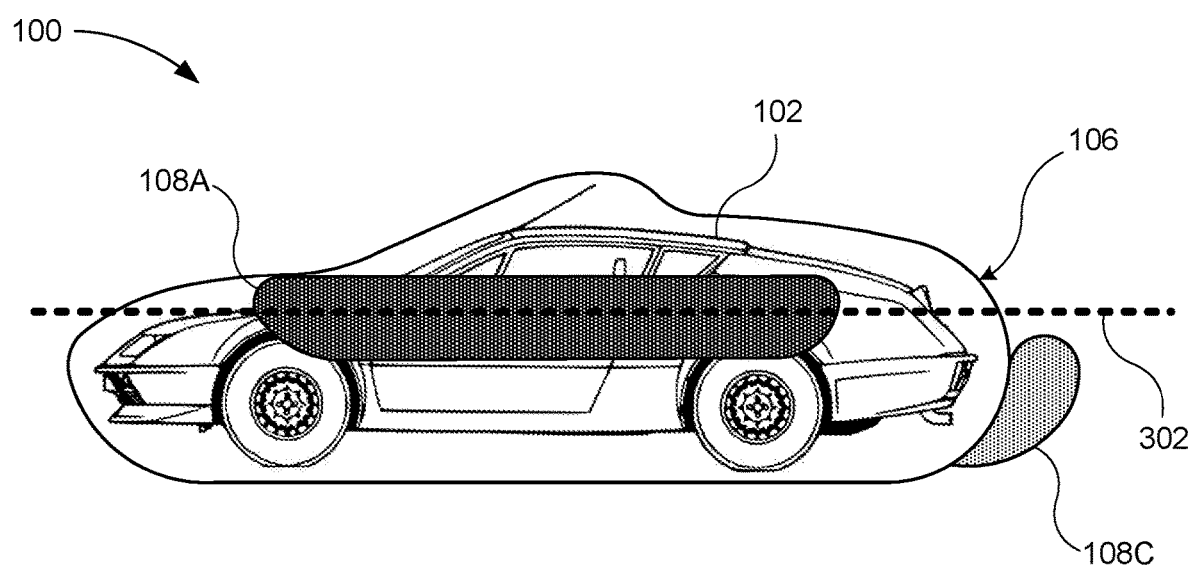
FIG. 4 is a side elevation view further illustrating the system of FIG. 1 with a rear-heavy vehicle in accordance with one embodiment of the present invention.

FIG. 4 is a side elevation view further illustrating the system 100 of FIG. 1 with a rear-heavy vehicle 102. In the illustrated embodiment, the vehicle 102 may have a rear-mounted engine or otherwise have a weight distribution which is greater near a rear end of the vehicle 102. Accordingly, a rearward flotation container 108C is coupled to the collapsible enclosure 106 to provide corresponding buoyancy. The position and buoyancy contribution of the rearward flotation container 108C may facilitate a more level or stable flotation of the vehicle 102 in the collapsible enclosure 106. While FIGS. 3 and 4 illustrate embodiments which include either a forward flotation container 108B or a rearward flotation container 108C, other embodiments include both a forward flotation container 108B and a rearward flotation container 108C. The forward flotation container 108B and rearward flotation container 108C may be of equal or unequal sizes, equal or unequal elevations relative to the water level 302, or the like.

Figure 5:
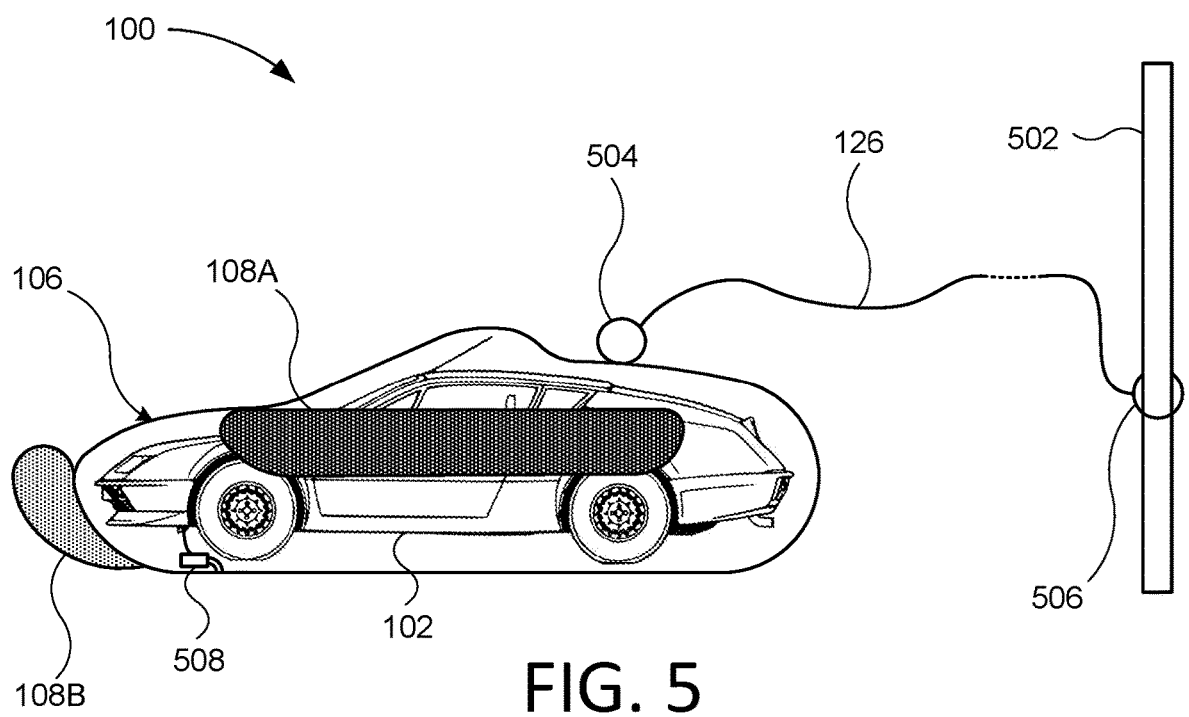
FIG. 5 is a side elevation view further illustrating the system of FIG. 1 in conjunction with a structure in accordance with one embodiment of the present invention.

FIG. 5 is a side elevation view further illustrating the system 100 of FIG. 1 in conjunction with a structure 502. In the illustrated embodiment, the tether 126 of the collapsible enclosure 106 secures the vehicle 102 and the collapsible enclosure to the structure 502. In the illustrated embodiment, the collapsible enclosure 106 is a pole. In other embodiments, the structure 502 may be another man-made or natural structure such as a building, tree, light pole, rock face, or the like.

In the illustrated embodiment, the tether 126 includes an enclosure attachment point 504 and a structure attachment point 506. One or both of the enclosure attachment point 504 and the structure attachment point 506 may be lockable via combination, key, code, or the like. In some embodiments, at least one of the tether 126, the enclosure attachment point 504, and the structure attachment point 506 includes at least one of a shock absorber, a fail point, or a release mechanism to reduce the amount of shock that can be delivered to at least one of the tether 126, the collapsible enclosure 106, the vehicle 102, and the structure 502. In some embodiments, the tether 126 releases from the structure 502 or the collapsible enclosure 106 in response to forces exceeding a predetermined amount. In this manner, the tether may prevent damage to at least one of the vehicle 102, the collapsible enclosure 106, and the structure 502.

In the illustrated embodiment, the collapsible enclosure 106 includes an on-board device 508. The illustrated on-board device 508 is a bilge pump. In other embodiments, the on-board device 508 is a solar generator, a beacon or other locator, an inflation pump, a light, an owner identifier or contact facilitator, a dehumidifier, or the like. In some embodiments, the on-board device 508 may be coupled to a power system of the vehicle 102. In this manner, the on-board device 508 may receive power from or supply power to the vehicle 102. In some embodiments, the on-board device 508 triggers inflation or other actions pertaining to the flotation containers 108A, 108B. For example, the on-board device 508 may trigger inflation in response to detection of low pressure, detection of flooding, or the like.

Figure 6:
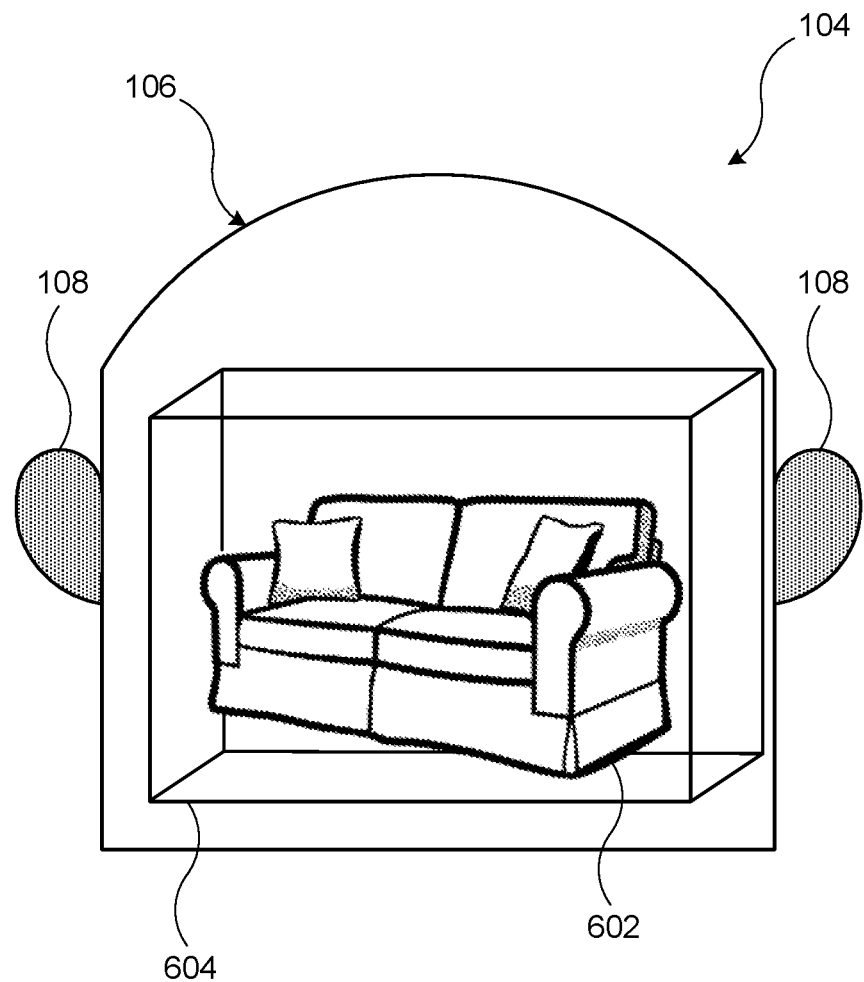
FIG. 6 is a front elevation view illustrating one embodiment of the apparatus of FIG. 1 used to protect an object in accordance with the present invention.

FIG. 6 is a front elevation view illustrating one embodiment of the apparatus 104 of FIG. 1 used to protect an object 602. In the illustrated embodiment, the apparatus 104 includes the collapsible container 106 with flotation containers 108 as described above. In the illustrated embodiment, the collapsible container 106 encloses and protects an object 602. While in previous figures, a vehicle 102 is shown and described, the illustrated embodiment depicts an object 602 in the form of a piece of furniture. The illustrated embodiment also includes a frame 604 within the collapsible enclosure 604. The frame 604 may facilitate collection of one or more objects 602 within the collapsible enclosure 106. The frame 604 may support the collapsible enclosure 106. In some embodiments, the frame 604 is separate from the collapsible enclosure 106. In other embodiments, the frame 604 may be at least partially integrated or connected to the collapsible enclosure 106. The frame 604 may be at least partially collapsible or fully rigid. In some embodiments, the frame 604 provide structural protection to the object 602 within the collapsible enclosure 106. In some embodiments, the frame 604 reduces the chance that the object 602 may damage the collapsible enclosure 106.

Figure 7:
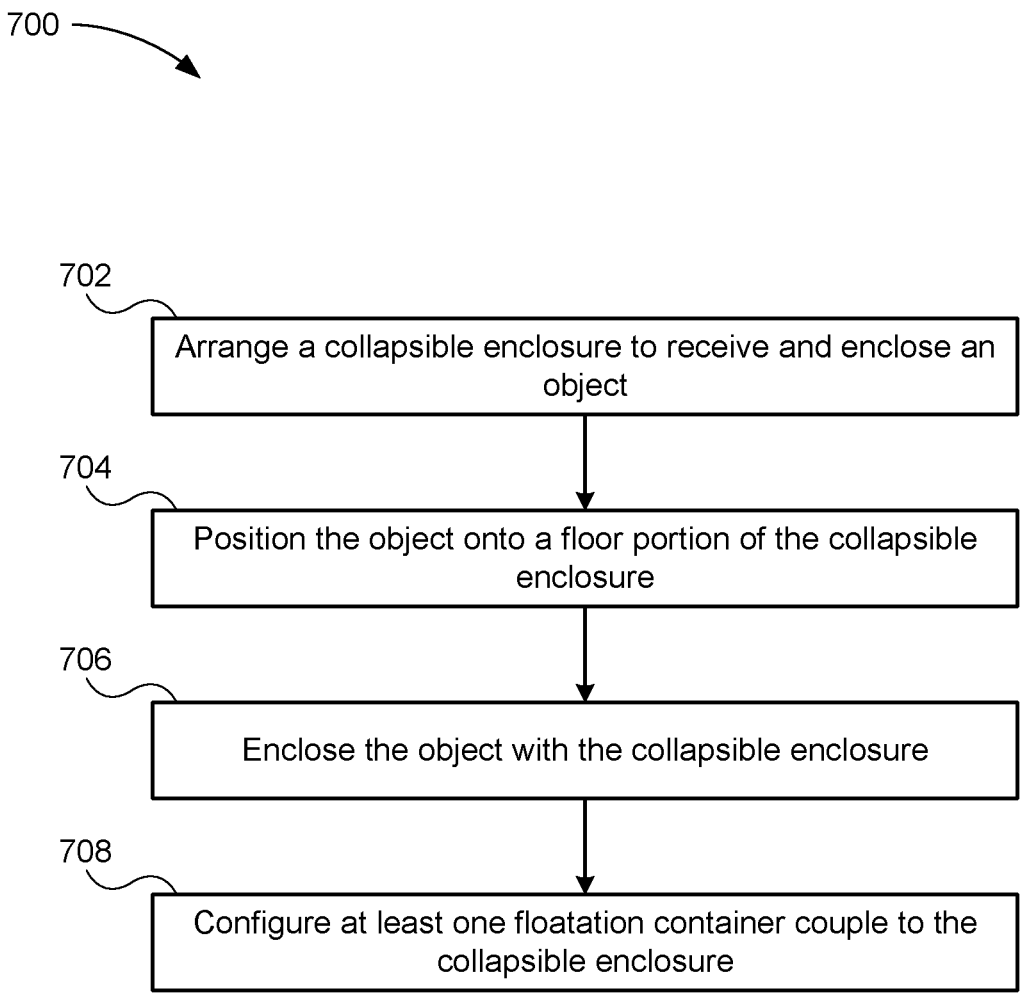
FIG. 7 is a flow diagram illustrating one embodiment of a method in accordance with the present invention.

FIG. 7 is a flow diagram illustrating one embodiment of a method 700. The illustrated embodiment of the method 700 includes, at block 702, arranging a collapsible enclosure to receive and enclose an object. The method 700 also includes, at block 704, positioning the object onto a floor portion of the collapsible enclosure. The method also includes, at block 706, enclosing the object with the collapsible enclosure. The method also includes, at block 708, configuring at least one flotation container coupled to the collapsible enclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a collapsible enclosure comprising:
a floor portion;
a top portion disposed opposite the floor portion;
a side portion extending between the floor portion and the top portion, the collapsible enclosure being sealable to resist fluid penetration;
a flotation container coupled to the collapsible enclosure to provide buoyancy to the collapsible enclosure; and
an impact resistant armor configured to be positioned on an exterior of the side portion adjacent a window of a content of the collapsible enclosure, and wherein the impact resistant armor is repositionable on the exterior relative to the collapsible enclosure.

2. The apparatus of claim 1, further comprising at least one flotation element captured within the flotation container.

3. The apparatus of claim 2, wherein the flotation container is deformable to accommodate a geometry of the at least one flotation element.

4. The apparatus of claim 2, wherein the at least one flotation element comprises a plastic container.

5. The apparatus of claim 2, wherein the at least one flotation element comprises foam.

6. The apparatus of claim 5, wherein the foam comprises a closed-cell foam.

7. The apparatus of claim 1, further comprising a tether to secure the collapsible enclosure relative to a structure.

8. The apparatus of claim 1, further comprising a reinforcement element coupled to at least one of the floor portion, the top portion, and the side portion.

9. The apparatus of claim 8, wherein the reinforcement element comprises a platform to support a content of the collapsible enclosure.

10. The apparatus of claim 8, wherein the reinforcement element comprises a frame to at least partially define an internal space within the collapsible enclosure.

11. The apparatus of claim 1, further comprising a closure element to facilitate closure of the collapsible enclosure around a content of the collapsible enclosure.

12. The apparatus of claim 1, further comprising a seal element to reduce a likelihood of fluid penetration into the collapsible enclosure.

13. A system comprising:
an apparatus for protecting an object from a flood, the apparatus comprising:
a collapsible enclosure comprising:
a floor portion;
a top portion disposed opposite the floor portion;
a side portion extending between the floor portion and the top portion, the enclosure being closeable to resist fluid penetration;
a flotation container coupled to the collapsible enclosure to provide buoyancy to the collapsible enclosure;
a vehicle positioned within the collapsible enclosure, the collapsible enclosure to resist exposure of the vehicle to a fluid; and
an impact resistant armor configured to be positioned on an exterior of the side portion adjacent a window of the vehicle, and wherein the impact resistant armor is repositionable on the exterior relative to the collapsible enclosure.

14. The system of claim 13, wherein the vehicle is positioned on a reinforcement element within the collapsible enclosure.

15. The system of claim 13, wherein at least one of the flotation container and a content of the flotation container has a buoyancy corresponding to a weight distribution of the vehicle.

16. The system of claim 13, further comprising a closure element disposed in at least one of the top portion and the side portion of the collapsible enclosure so as to be near a top of the vehicle when the vehicle is within the collapsible enclosure.

17. A method comprising:
arranging a collapsible enclosure to receive and enclose an object;
positioning the object onto a floor portion of the collapsible enclosure;
enclosing the object with the collapsible enclosure;
configuring at least one flotation container coupled to the collapsible enclosure; and
positioning an impact resistant armor configured to be positioned on an exterior of a side portion adjacent a window of the object, and wherein the impact resistant armor is repositionable on the exterior relative to the collapsible enclosure.

18. The method of claim 17, wherein configuring the at least one flotation container comprises capturing at least one flotation element within the at least one flotation container.

19. The method of claim 17, further comprising coupling a tether of the collapsible enclosure to a structure to secure the collapsible enclosure.

* * * * *